W. A. TURBAYNE.
DYNAMO-ELECTRIC MACHINE.
APPLICATION FILED MAR. 31, 1916. RENEWED MAR. 16, 1922.

Witnesses
David H. Finkler
Ralph Munden

Inventor
William A. Turbayne
By
Raymond H. Van Kirk
Attorney

W. A. TURBAYNE.
DYNAMO-ELECTRIC MACHINE.
APPLICATION FILED MAR. 31, 1916. RENEWED MAR. 16, 1922.

1,434,974.

Patented Nov. 7, 1922.
3 SHEETS—SHEET 2.

Witnesses
David H. Tinkler
Ralph Munden

Inventor
William A. Turbayne
By Raymond H. Van Vleet.
Attorney

W. A. TURBAYNE.
DYNAMO-ELECTRIC MACHINE.
APPLICATION FILED MAR. 31, 1916. RENEWED MAR. 16, 1922.

1,434,974.

Patented Nov. 7, 1922.

Witnesses
David H. Tinkler
Ralph Munden

Inventor
William A. Turbayne
By Raymond H. Van Vleet
Attorney

Patented Nov. 7, 1922.

1,434,974

UNITED STATES PATENT OFFICE.

WILLIAM A. TURBAYNE, OF NIAGARA FALLS, NEW YORK, ASSIGNOR TO U. S. LIGHT & HEAT CORPORATION, OF NIAGARA FALLS, NEW YORK, A CORPORATION OF NEW YORK.

DYNAMO-ELECTRIC MACHINE.

Application filed March 31, 1916, Serial No. 88,065. Renewed March 16, 1922. Serial No. 544,257.

*To all whom it may concern:*

Be it known that I, WILLIAM A. TURBAYNE, a citizen of the United States, residing at Niagara Falls, in the county of Niagara and State of New York, have invented new and useful Improvements in Dynamo-Electric Machines, of which the following is a specification.

This invention relates to single unit starters and lighters.

More particularly the invention relates to a dynamo-electric machine adapted for use as a starting motor and battery charging generator in an automobile starting and lighting system.

In such systems a single dynamo-electric machine performs both functions, acting first as a motor to start the engine, and thereafter as a generator to supply current. This is known as the single unit system as distinguished from the system in which separate machines perform the functions of motor and generator, known as the double unit system. In a single unit system the dynamo-electric machine is mechanically connected by gears, or otherwise, to the engine crank shaft. A storage battery is connected across the terminals of the machine. The storage battery furnishes current to operate the machine as a motor to start the engine, and after the engine begins to operate under its own power, the dynamo-electric machine is operated by the engine as a generator to charge the storage battery and supply lamps or other translating devices on the automobile. The speed of the engine, and hence the speed of the generator, varies widely. It is desirable to maintain the output of the generator within predetermined limits, regardless of the generator speed, so as to prevent injury to the battery and to provide a proper charging current therefor. In practice it is often desired to hold the output substantially constant, notwithstanding speed variations. This result has generally been accomplished heretofore in practice by employing a regulator in the field circuit to vary the field resistance inversely as the speed. This regulator is mechanically or electro-magnetically operated.

In some recent systems the generator output has been maintained at the proper value without the use of an external regulator, the generator inherently delivering the proper current under varying speed conditions. The electrical conditions in a single unit system are peculiar and present many difficulties in obtaining proper inherent output control. The machine must be capable of exerting a very high torque for a short time when acting as a starting motor. When acting as a generator, however, the output must be held to a very low value, as the storage batteries employed are small and the current required for charging is correspondingly small. Obviously, these conditions demand dynamo-electric machines of widely different characteristics. To obtain the required starting torque, it is necessary to provide a low resistance armature of relatively few conductors, capable of carrying a very high current in starting. In generating, a very much lower value of current is needed, but the induced voltage must be sufficiently high to overcome the back pressure of the battery. In certain compromise designs, in order to develop this induced voltage at the specified armature speeds, a large field flux is required which may be obtained only by the expenditure of a heavy exciting current. It has also been proposed to use an armature provided with two commutators and two windings, one a low resistance winding to be used in starting, and the other a comparatively high resistance winding to be used only in generating. Such a design necessarily has a very poor weight efficiency.

According to the present invention, a dynamo-electric machine is provided having a single armature winding and commutator and in which, by a mere manipulation of the starting switch and a very simple system of connections, it is possible to have either a multiple pole high torque machine with a low resistance armature for starting, or an inherently regulated machine with half the number of poles, and twice the number of armature conductors in series for producing the desired charging voltage.

An object of the present invention is to provide a dynamo-electric machine with high efficiency, both as a motor and a generator.

A further object is to provide a starting and lighting system of the single unit type in which the best performance is obtained with the simplest possible connections.

A further object is to provide a single unit starter and generator with a high weight efficiency.

A further object is to provide an inherently regulated generator of high efficiency which has also a high efficiency as a motor.

Other objects will be apparent from the description which follows:

Referring to the drawings:—

Figure 1:
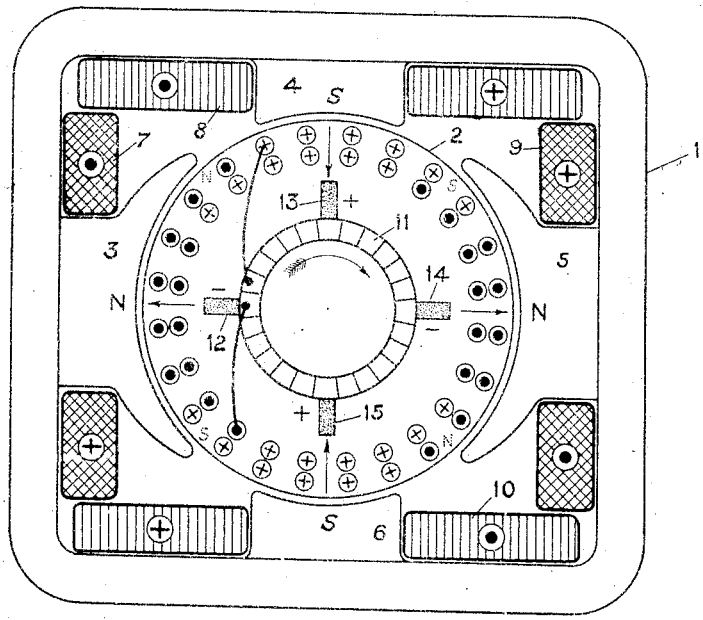
Figure 1 represents a four pole dynamo-electric machine with conventional symbols representing the relative directions of current flow therein when said machine is operating as a motor.

The dynamo-electric machine is represented by the numeral 1. Said machine is shown as being provided with a rotatable armature 2, which may be mechanically connected in any suitable manner with an internal combustion engine, not shown. Said dynamo-electric machine 1 is shown as being provided with four field poles, 3, 4, 5 and 6, provided with field windings 7, 8, 9 and 10 respectively. When the machine is operating as a motor, all four field windings, 7, 8, 9 and 10 are connected in circuit, whereas when the machine is operating as a generator, 8 and 10 will be cut out for reasons to be pointed out hereinafter.

The armature 2 is provided with a commutator 11 having brushes 12, 13, 14 and 15 bearing thereon. The armature winding is placed in slots spaced 120 electrical degrees apart relative to the generator poles, which winding, I have found, is equally effective when driven in either a four pole field or a two pole field with suitably designed field poles. With the number of poles illustrated in the drawings, it will be clear that the ratio between the armature pitch and the pitch between the main generating poles 3 and 5 is equal to 120/180 or 2/3. With reference to all four poles illustrated, this ratio will be equal to 120/90 or 4/3. This ratio, I have discovered, between armature pitch and field pole pitch gives the best results for operation in both bipolar and four pole fields. This ratio is to be maintained according to the present invention, regardless of the fact that the invention contemplates a dynamo-electric machine having multiples of the number of poles illustrated.

Figure 7:
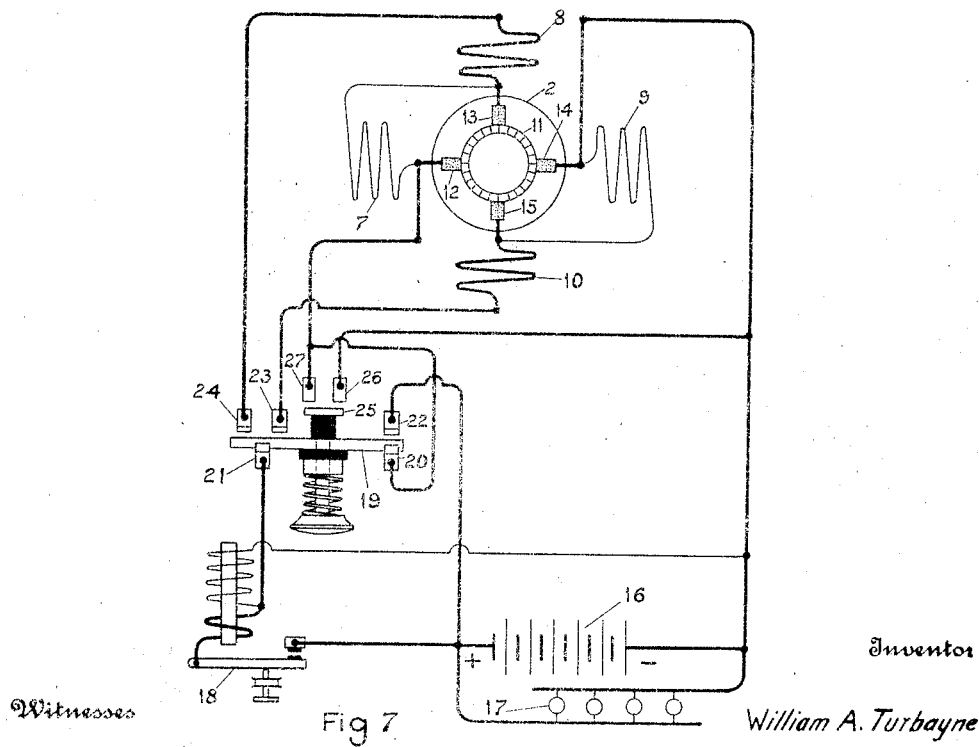
Figure 7 is a wiring diagram of a starting and lighting system according to the present invention.

Referring now to Figure 7, in which the wiring diagram of the starting and lighting system is illustrated, the armature is shown in operative relation to a storage battery 16, across which may be connected a lighting circuit 17. Between the armature 2 and the battery 16 is an automatic switch 18, which may be of any preferred construction. It is designed to close and remain closed as long as the dynamo-electric machine is operative to develop a predetermined voltage. Also arranged in circuit between the dynamo-electric machine and the battery is a starting switch 19, biased to its lowermost position. This biased position is the running position. In such position the switch 19 connects contacts 20 and 21, completing circuit from brush 12 to one side of the automatic switch, whence circuit may be completed through the automatic switch 18 and battery 16 to the brush 14. When said switch 19 is moved upwardly against the tension of its spring, it will connect contacts 22, 23 and 24. Mounted to move with switch 19 is switch 25, which in its uppermost position will connect contacts 26 and 27. When switch 19 is moved to its uppermost position, therefore, brushes 12 and 14 will be connected directly together, while brushes 13 and 15 will be connected through windings 8 and 10. Furthermore, one terminal of the battery will be connected through windings 8 and 10 to brushes 13 and 15 respectively.

Figures 5, 6:
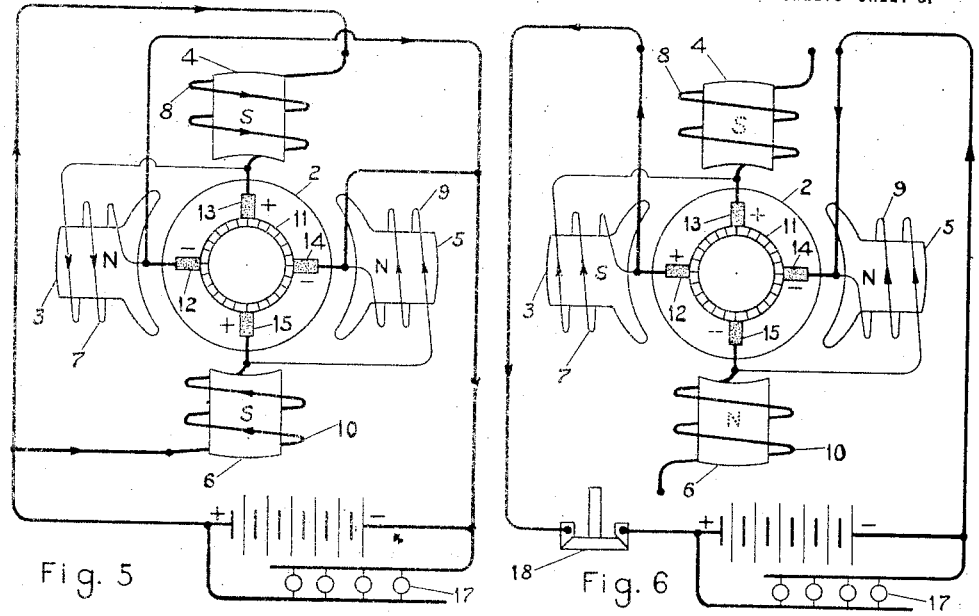
Figures 5 and 6 are simplified wiring diagrams showing the connections for starting and generating, respectively.

In operation, when it is desired to operate the dynamo-electric machine as a motor to start the engine, the operator will press the switch 19 to its uppermost position, establishing the connections illustrated in Figure 5. Current leaving the positive battery terminal will divide, one half traversing winding 10 to brush 15 and the other half traversing winding 8 to brush 13.

Figure 2:
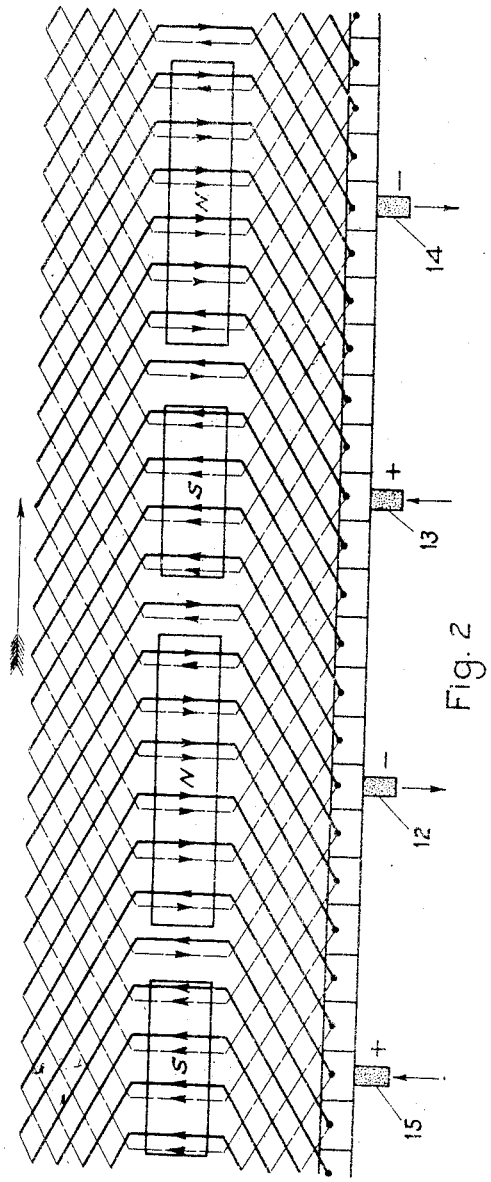
Figure 2 is a development of the armature of the machine illustrated in Figure 1, illustrating the direction of current flow when said machine is operating as a motor.

Poles 6 and 4, excited by windings 10 and 8 will be of like polarity, indicated as South. A certain amount of current will flow through the shunt winding 7 to the negative brush 12 and a certain amount through the shunt winding 9 to the negative brush 14. Poles 3 and 5, excited by windings 7 and 9, will be of like polarity, indicated as North. There are therefore produced alternate poles of opposite polarity. Battery current will also circulate in the armature conductors in the direction indicated in Figures 1 and 2. By reason of the low resistance of the circuits the machine will develop a high torque. The low armature resistance, as is apparent from the drawing, is due to the fact that under motoring conditions current has four parallel paths through the armature. Under generating conditions the same number of conductors are divided into two parallel paths. Therefore, under motoring conditions the armature resistance is only one-fourth of that under generating conditions.

Figure 3:
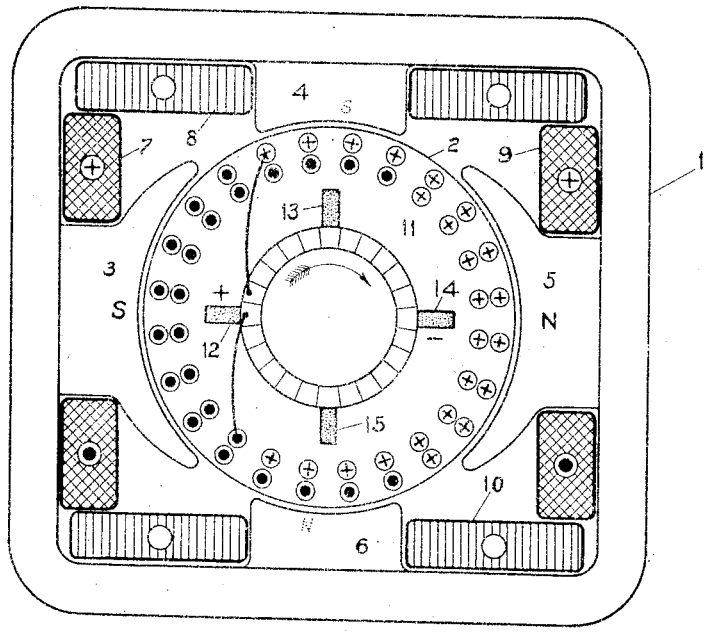
Figure 3 represents the same machine represented in Figure 1 but indicating conditions when said machine is operating as a generator.
Figure 4:
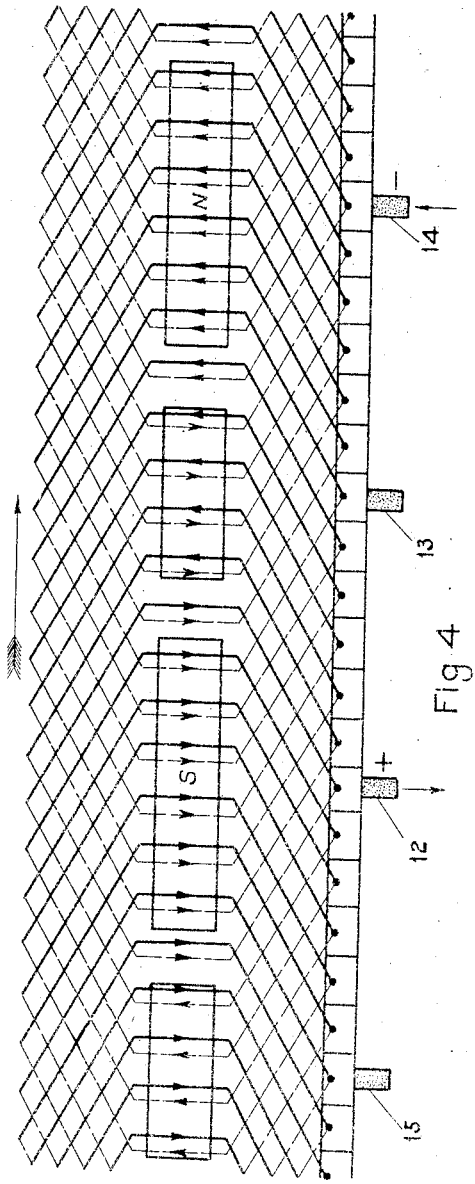
Figure 4 is a development similar to Figure 2, but showing conditions when said machine is operating as a generator.

After the engine has been started, the operator will release the starting switch, establishing the connections illustrated in Figure 3. At this time the automatic switch 8 will be open. Current will now pass from the positive brush 12, through the shunt coil 7 to brush 13, through the armature winding to brush 15, thence through the coil 9 to the brush 14. Poles 3 and 5, excited by coils 7 and 9, will be of unlike polarity, indicated as South and North respectively. Under this condition the series windings on poles 4 and 6 will be disconnected from circuit and under no load conditions these poles will be neutral and maximum terminal voltage will be impressed across the shunt field windings 7 and 9. When the automatic switch closes, however, and current flows to the battery, this current will circulate in the armature windings in the direction indicated in Figures 3 and 4. Pole 4 will now become a south pole and pole 6 will become a north pole, with the result that a difference of potential will be developed between brushes 13 and 15, the potential of brush 13 being higher than that of brush 15, so that under this condition, the current circulating in the shunt field winding will be reduced, inasmuch as the voltage effective across brushes 12 and 13 and across brushes 14 and 15 will fall off in value as the voltage developed across brushes 13 and 15 increases, due to the quadrature flux developed by the working armature current.

It will be apparent, therefore, that the shunt fields are so connected as to give maximum aid in developing heavy flux under motoring conditions and in producing inherent regulation of the generator when the machine performs as such, and furthermore, that all magnetic material is usefully employed, both under motoring and generating conditions.

One embodiment of the present invention has been described in detail. Various modifications will suggest themselves to those skilled in the art. It is intended in this case to cover all such modifications that fall within the scope of the invention as defined by the appended claims.

Having described my invention, what I claim as new and desire to secure by Letters Patent of the United States, is:

1. In a dynamo-electric machine, a field magnet frame, a set of pole pieces extending therefrom, a second set of pole pieces extending therefrom and arranged alternately with the pole pieces of said first set, windings on said pole pieces, an armature, two sets of brushes, the brushes of one set being connected together through the windings on one of said sets of pole pieces and each of the other windings being connected across adjacent brushes, said windings being wound to render adjacent poles of opposite polarity.

2. In combination, a dynamo-electric machine adapted to operate either as a motor or a generator and having two sets of pole pieces, the pole pieces of one set being alternately arranged with the pole pieces of the other set, series windings on one of said sets, shunt windings in the other of said sets, said windings being wound to produce poles of alternate polarity to produce a high torque when said machine is operating as a motor, and means for nullifying said series windings when said machine is operating as a generator.

3. A dynamo electric-machine adapted to operate either as a motor or as a generator, said machine having two sets of pole pieces, series and shunt windings on said pole pieces wound to produce poles of alternate polarity to produce a high torque when said machine is operating as a motor, an armature and two sets of brushes connecting said shunt windings with said commutator, a fractional part only of said brushes connecting said series windings with said commutator.

4. A dynamo-electric machine adapted to operate either as a motor or a generator, said machine having two sets of pole pieces, the pole pieces of one set being alternately arranged with the pole pieces of the other set, series windings on one of said sets, shunt windings on the other of said sets, said windings being wound to produce poles of alternate polarity to produce a high torque when said machine is operating as a motor, an armature and two sets of brushes connected therewith, one set of brushes connecting ends of said series windings and ends of said shunt windings with said armature and another set of brushes connecting the other ends of said shunt windings with said armature.

5. In combination, a dynamo-electric machine having a single armature and a single commutator, two sets of flux-supplying pole pieces co-operating to provide a high torque during motoring operations, and means whereby the flux-supplying quality of one of said sets of pole pieces is nullified whereby the poles of said last mentioned set become regulating poles.

6. In combination, a dynamo-electric machine having a single commutator, a set of field poles carrying series windings, a set of field poles carrying shunt windings, the poles of one set being arranged alternately with those of the other set, a pair of brushes bearing on said commutator for each set of windings, said field poles being adapted to supply flux of alternate polarities to produce a high torque under motoring conditions, connections between said shunt windings and said brushes for said series windings, and means for open-circuiting said series windings whereby said first set of field poles become regulating poles to induce a counter electro-motive force across certain of said brushes.

7. In combination, a dynamo-electric machine having a single armature and a single commutator, a set of field poles carrying windings, a second set of field poles carrying windings, the poles of one set being arranged alternately with those of the other set, a pair of brushes bearing on said commutator for each set of windings, said field poles being adapted to supply flux of alternate polarities to produce a high torque under motoring conditions, connections between the windings of one set and the brushes of the windings of said other set, and means for open circuiting the windings carried by said first set of field poles, whereby said first set of field poles become regulating poles to induce a counter electro-motive force across one of said pairs of brushes.

8. In combination, a dynamo-electric machine having a single armature and a single commutator, said armature being provided with conductors, a pair of field poles respectively provided with windings, a storage battery, means for connecting one of said windings and part of said armature conductors across said battery, said means also serving to connect the other of said windings and the remainder of said armature conductors across said battery, a second pair of field poles provided with windings, all of said windings co-operating to produce poles of alternate polarities under motoring conditions, a plurality of brushes, each of said windings being connected to said armature through a brush, said means also serving to connect all said armature conductors in parallel paths across said battery and to open circuit said first mentioned windings whereby the armature cross flux may set up a counter electro-motive force across certain of said brushes for regulating purposes.

9. A dynamo-electric machine provided with two sets of pole pieces and two sets of brushes corresponding thereto, series windings on one set of pole pieces and shunt windings connected across certain of said brushes on the other set of pole pieces, said two sets of pole pieces co-operating to produce a strong field for motoring purposes and whereby when said windings are open circuited said first set of pole pieces may aid armature reaction for regulating purposes under generating conditions.

10. A multipolar dynamo-electric machine having adjacent poles of opposite polarity and exciting circuits for said poles, said poles co-operating to produce a strong field under motoring conditions, combined with means for killing the exciting circuits of alternate poles and changing circuits of the remaining pole pieces to render them alternate in polarity, whereby said alternate poles may aid armature reaction for regulating purposes.

11. In combination, a dynamo-electric machine having spaced field poles of like polarity, other spaced field poles of the opposite polarity located intermediate of said first mentioned poles, exciting circuits for said poles, an armature provided with conductors, and means for controlling the exciting circuit of said first mentioned field poles and for determining whether said armature conductors shall be connected in four parallel circuits or in two parallel circuits.

12. A dynamo-electric machine adapted to operate either as a motor or as a generator, said machine having a plurality of pole pieces adapted to be excited to give alternate north and south poles when said machine is operating as a motor, means for cutting out the excitation of some of said pole pieces whereby only alternate pole pieces are excited when operating as a generator and whereby the intermediate pole pieces act as unwound poles for regulating purposes, said machine having an armature provided with windings of a pitch of approximately 120 electrical degrees relative to said generating pole pieces.

13. A dynamo-electric machine adapted to operate either as a motor or a generator, said machine having a plurality of pole pieces adapted to be excited to give alternate north and south poles when said machine is operating as a motor, means for cutting out the excitation of alternate pole pieces of the same polarities, whereby said alternate pole pieces act as unwound poles when said machine is operating as a generator, said machine having an armature provided with windings of a pitch of approximately 120 electrical degrees relative to the remaining excited pole pieces.

14. An inherently regulated generator provided with main poles and regulating poles, said regulating poles being provided with windings adapted to be connected in circuit when said generator is operated as a motor and an armature provided with a winding of approximately 120 electrical degree pitch, relative to said main poles, and means for nullifying said windings during the performance of generating functions.

15. An inherently regulated generator having main poles and regulating poles, said regulating poles being provided with windings adapted to be connected in circuit when said generator is operated as a motor, to provide a succession of poles of alternate polarities, an armature having a winding with symmetrical end connections, main brushes in line with the main poles, and regulating brushes in line with the regulating poles, windings on said main poles connected between main and regulating brushes, whereby as the armature speed increases under generating conditions a counter electro-motive force will be set up across said regulating brushes to reduce the energization of said main poles.

16. A dynamo-electric machine having $n$ field poles and an armature with a single winding having a coil pitch approximately equal to 4/3 of the pitch of said field poles, said poles being provided with exciting circuits, and means for selectively controlling said exciting circuits to provide an $n$ pole motor or an $n/2$ pole generator with intermediate regulating poles.

17. A dynamo-electric machine having $n$ field poles and an armature with a single winding having a coil pitch approximately equal to 4/3 of the pitch of said field poles, positive and negative armature leads, means for connecting said leads through said armature in $m$ parallel paths and switching means for rendering said machine an $n/2$ pole machine with intermediate regulating poles and at the same time connecting the armature winding in $m/2$ parallel paths.

18. A dynamo-electric machine having a single armature, a single commutator and a plurality of field poles, the winding of said armature being of a pitch approximately equal to 4/3 of the field pole pitch, and selective means for nullifying the flux supplying qualities of certain of said poles to thereby render them regulating poles and at the same time connecting said armature winding in $m$ parallel paths or $m/2$ parallel paths.

19. An electric motor having $n$ field poles and an armature winding of a pitch approximately equal to 4/3 of the field pole pitch having $m$ parallel paths for current, and switching means whereby said motor may operate as an $n/2$ pole generator with $n/2$ regulating poles and whereby said armature winding will have only $m/2$ parallel paths.

20. An $n$ pole motor provided with connections whereby it may operate as an $n/2$ pole generator with $n/2$ regulating poles, and having an armature with a winding pitch of approximately 120 electrical degrees.

21. In combination, a dynamo-electric machine adapted to operate either as a motor or as a generator and having a single armature winding and two sets of pole pieces, the pole pieces of one set being alternately arranged with the pole pieces of the other set, series windings on one of said sets, shunt windings on the other of said sets, said windings being wound to produce poles of alternate polarity to produce a high torque when said machine is operating as a motor, and means for nullifying said series windings and changing the circuits of the shunt windings to produce alternate polarities in the shunt wound poles when said machine is operating as a generator.

In witness whereof, I have hereunto subscribed my name.

WILLIAM A. TURBAYNE.